United States Patent [19]

Scott et al.

[11] Patent Number: 4,710,844
[45] Date of Patent: Dec. 1, 1987

[54] ELECTRONIC CIRCUIT BREAKER TRIP FUNCTION ADJUSTING CIRCUIT

[75] Inventors: Graham A. Scott, Avon; Alan J. Messerli, Naugatuck, both of Conn.

[73] Assignee: General Electric Company, New York, N.Y.

[21] Appl. No.: 895,400

[22] Filed: Aug. 11, 1986

Related U.S. Application Data

[63] Continuation-in-part of Ser. No. 760,224, Jul. 29, 1985, abandoned.

[51] Int. Cl.[4] .............................................. H02H 7/00
[52] U.S. Cl. ........................................ 361/96; 361/93
[58] Field of Search ..................... 361/42, 93, 94, 95, 361/96, 97

[56] References Cited

U.S. PATENT DOCUMENTS

| 4,038,695 | 7/1977 | DePuy | 361/96 |
| 4,115,829 | 9/1978 | Howell | 361/42 |
| 4,442,472 | 4/1984 | Pang et al. | 361/95 X |
| 4,589,052 | 5/1986 | Dougherty | 361/94 |

Primary Examiner—A. D. Pellinen
Assistant Examiner—Derek S. Jennings
Attorney, Agent, or Firm—Richard A. Menelly; Walter C. Bernkopf; Fred Jacob

[57] ABSTRACT

The overcurrent trip levels of an electronic circuit breaker are selected by means of a variable resistance ladder network comprising binary encoded switches. The binary encoded switches reduce the size and cost of the trip unit, rendering electronic trip facility to a wider range of industrial circuit breakers utilizing both analog as well as digital processing circuits.

18 Claims, 25 Drawing Figures

Fig. 7A. CURRENT SETTING:

| RESISTORS | BCD CODE S1 S2 S3 S4 | EQUIVALENT RESISTANCE | SETTING | RESISTOR VALUES |
|---|---|---|---|---|
|  | 1 1 1 1 | NOT USED Ω |  |  |
|  | 1 1 1 0 | NOT USED |  |  |
| R1,R2,R4 | 1 1 0 1 | 30677 | .5X | R1 = 71700 Ω |
| R1,R2 | 1 1 0 0 | 35173 | .55X | R2 = 69000 |
| R1,R3,R4 | 1 0 1 1 | 39197 | .6X | R3 = 135000 |
| R1,R3 | 1 0 1 0 | 46848 | .7X | R4 = 240000 |
| R1,R4 | 1 0 0 1 | 55233 | .8X |  |
| R1 | 1 0 0 0 | 71700 | 1.0X |  |
|  | 0 1 1 1 | NOT USED |  |  |
|  | 0 1 1 0 | NOT USED |  |  |

Fig. 7B. LONG TIME PICKUP:

| RESISTORS | BCD CODE S1 S2 S3 S4 | EQUIVALENT RESISTANCE | SETTING | RESISTOR VALUES |
|---|---|---|---|---|
|  | 0 0 0 0 | NOT USED Ω |  | R1 = 926000 Ω |
|  | 0 0 0 1 | NOT USED |  | R2 = 2600000 |
|  | 0 0 1 0 | NOT USED |  | R3 = 2500000 |
|  | 0 0 1 1 | NOT USED |  | R4 = 5900000 |
|  | 0 1 0 0 | NOT USED |  |  |
|  | 0 1 0 1 | NOT USED |  |  |
| R1,R3 | 0 1 1 0 | 1270000 | .8C |  |
| R3,R4,R5 | 0 1 1 1 | 1050000 | .9C |  |
| R1 | 1 0 0 0 | 926000 | 1.0C |  |
| R1,R4 | 1 0 0 1 | 800000 | 1.1C |  |

Fig. 7C. LONG TIME DELAY:

| RESISTORS | BCD CODE S1 S2 S3 S4 | | | | EQUIVALENT RESISTANCE | SETTING | RESISTOR VALUES |
|---|---|---|---|---|---|---|---|
|  | 0 | 0 | 0 | 0 | NOT USED Ω |  |  |
|  | 0 | 0 | 0 | 1 | NOT USED |  | R1 = NOT PRESENT |
| R3 | 0 | 0 | 1 | 0 | 77500 | MIN | R2 = 5000 Ω |
| R3, R4 | 0 | 0 | 1 | 1 | 34400 | INT | R3 = 77500 |
| R1 | 0 | 1 | 0 | 0 | 5000 | MAX | R4 = 62200 |
|  | 0 | 1 | 0 | 1 | NOT USED |  |  |
|  | 0 | 1 | 1 | 0 | NOT USED |  |  |
|  | 0 | 1 | 1 | 1 | NOT USED |  |  |
|  | 1 | 0 | 0 | 0 | NOT USED |  |  |
|  | 1 | 0 | 0 | 1 | NOT USED |  |  |

Fig. 7D. SHORT TIME PICKUP:

| RESISTORS | BCD CODE S1 S2 S3 S4 | | | | EQUIVALENT RESISTANCE | SETTING | RESISTOR VALUES |
|---|---|---|---|---|---|---|---|
|  | 0 | 0 | 0 | 0 | OPEN CIRCUIT Ω | 2C |  |
| R4 | 0 | 0 | 0 | 1 | 1000000 | 3C | R1 = NOT PRESENT |
| R3 | 0 | 0 | 1 | 0 | 530000 | 4C | R2 = 200000 Ω |
| R3, R4 | 0 | 0 | 1 | 1 | 346000 | 5C | R3 = 530000 |
| R2 | 0 | 1 | 0 | 0 | 200000 | 7C | R4 = 1000000 |
| R1, R4 | 0 | 1 | 0 | 1 | 167000 | 8C |  |
| R2, R3 | 0 | 1 | 1 | 0 | 145000 | 9C |  |
|  | 0 | 1 | 1 | 1 | NOT USED |  |  |
|  | 1 | 0 | 0 | 0 | NOT USED |  |  |
|  | 1 | 0 | 0 | 1 | NOT USED |  |  |

Fig. 7E.  SHORT TIME DELAY:

| RESISTORS | BCD CODE S1 S2 S3 S4 | | | | EQUIVALENT RESISTANCE | SETTING | RESISTOR VALUES |
|---|---|---|---|---|---|---|---|
|  | 0 | 0 | 0 | 0 | NOT USED |  | R1 = NOT PRESENT |
|  | 0 | 0 | 0 | 1 | NOT USED |  | R2 = NOT PRESENT |
| R3 | 0 | 0 | 1 | 0 | 30800 | MIN | R3 = 30800 |
| R3, R4 | 0 | 0 | 1 | 1 | 6460 | INT | R4 = 8200 |
|  | 0 | 1 | 0 | 0 | 0 | MAX |  |
|  | 0 | 1 | 0 | 1 | NOT USED |  |  |
|  | 0 | 1 | 1 | 0 | NOT USED |  |  |
|  | 0 | 1 | 1 | 1 | NOT USED |  |  |
|  | 1 | 0 | 0 | 0 | NOT USED |  |  |
|  | 1 | 0 | 0 | 1 | NOT USED |  |  |

Fig. 7F.  GROUND FAULT PICKUP:

| RESISTORS | BCD CODE S1 S2 S3 S4 | | | | EQUIVALENT RESISTANCE | SETTING | RESISTOR VALUES |
|---|---|---|---|---|---|---|---|
|  | 0 | 0 | 0 | 0 | INFINITE | .2X | R1 = 100 |
| R4 | 0 | 0 | 0 | 1 | 660 | .25X | R2 = 165 |
| R3 | 0 | 0 | 1 | 0 | 330 | .3X | R3 = 330 |
| R3, R4 | 0 | 0 | 1 | 1 | 220 | .35X | R4 = 660 |
| R2 | 0 | 1 | 0 | 0 | 165 | .4X |  |
| R2, R4 | 0 | 1 | 0 | 1 | 132 | .45X |  |
| R2, R3 | 0 | 1 | 1 | 0 | 110 | .5X |  |
| R2, R3, R4 | 0 | 1 | 1 | 1 | 94.3 | .55X |  |
|  | 1 | 0 | 0 | 0 | NOT USED |  |  |
|  | 1 | 0 | 0 | 1 | NOT USED |  |  |

Fig. 7G.   GROUND FAULT DELAY:

| RESISTORS | BCD CODE | | | | EQUIVALENT RESISTANCE | SETTING | RESISTOR VALUES |
|---|---|---|---|---|---|---|---|
| | $S_1$ | $S_2$ | $S_3$ | $S_4$ | | | |
| | 0 | 0 | 0 | 0 | NOT USED | | R1 = NOT PRESENT |
| | 0 | 0 | 0 | 1 | NOT USED | | R2 = 13000 |
| R3 | 0 | 0 | 1 | 0 | 42200 | MIN | R3 = 42200 |
| R3, R4 | 0 | 0 | 1 | 1 | 18200 | INT | R4 = 32000 |
| R2 | 0 | 1 | 0 | 0 | 13000 | MAX | |
| | 0 | 1 | 0 | 1 | NOT USED | | |
| | 0 | 1 | 1 | 0 | NOT USED | | |
| | 0 | 1 | 1 | 1 | NOT USED | | |
| | 1 | 0 | 0 | 0 | NOT USED | | |
| | 1 | 0 | 0 | 1 | NOT USED | | |

Fig. 7H.   INSTANTANEOUS:

| RESISTORS | BINARY CODE | | | | EQUIVALENT RESISTANCE | SETTING | RESISTOR VALUES |
|---|---|---|---|---|---|---|---|
| | $S_1$ | $S_2$ | $S_3$ | $S_4$ | | | |
| R1, R2, R3, R4 | 1 | 1 | 1 | 1 | 35595 | 4X | R1 = 51700 |
| R1, R2, R3 | 1 | 1 | 1 | 0 | 37253 | 4.5X | R2 = 200000 |
| R1, R2, R4 | 1 | 1 | 0 | 1 | 39072 | 5.0X | R3 = 400000 |
| R1, R2 | 1 | 1 | 0 | 0 | 41079 | 5.5X | R4 = 800000 |
| R1, R3, R4 | 1 | 0 | 1 | 1 | 43302 | 6.0X | |
| R1, R3 | 1 | 0 | 1 | 0 | 45780 | 7.0X | |
| R1, R4 | 1 | 0 | 0 | 1 | 48559 | 8.0X | |
| R1 | 1 | 0 | 0 | 0 | 51700 | 10.0X | |

Fig. 9A.    CURRENT SETTING:

| RESISTORS | BCD CODE | | | | EQUIVALENT RESISTANCE | SETTING | RESISTOR VALUES |
|---|---|---|---|---|---|---|---|
| | $S_5$ | $S_6$ | $S_7$ | $S_8$ | | | |
| | 0 | 0 | 0 | 0 | NOT USED | | |
| R8 | 0 | 0 | 0 | 1 | 700000 | 0.5X | R5 = 90000 |
| R7 | 0 | 0 | 1 | 0 | 450000 | 0.6X | R6 = 200000 |
| R7, R8 | 0 | 0 | 1 | 1 | 274000 | 0.7X | R7 = 450000 |
| R6 | 0 | 1 | 0 | 0 | 200000 | 0.8X | R8 = 700000 |
| R6, R8 | 0 | 1 | 0 | 1 | 156000 | 0.85X | |
| R5, R6 | 0 | 1 | 1 | 0 | 138000 | 0.9X | |
| R6, R7, R8 | 0 | 1 | 1 | 1 | 116000 | 0.95X | |
| R5 | 1 | 0 | 0 | 0 | 90000 | 1.0X | |
| | 1 | 0 | 0 | 1 | NOT USED | | |

Fig. 9B.    INSTANTANEOUS:

| RESISTORS | BCD CODE | | | | EQUIVALENT RESISTANCE | SETTING |
|---|---|---|---|---|---|---|
| | $S_5$ | $S_6$ | $S_7$ | $S_8$ | | |
| | 0 | 0 | 0 | 0 | NOT USED | |
| R8 | 0 | 0 | 0 | 1 | 700000 | 1.5X |
| R7 | 0 | 0 | 1 | 0 | 450000 | 2.0X |
| R7, R8 | 0 | 0 | 1 | 1 | 274000 | 2.5X |
| R6 | 0 | 1 | 0 | 0 | 200000 | 3.0X |
| R6, R8 | 0 | 1 | 0 | 1 | 156000 | 4.0X |
| R6, R7 | 0 | 1 | 1 | 0 | 138000 | 6.0X |
| R6, R7, R8 | 0 | 1 | 1 | 1 | 116000 | 8.0X |
| R5 | 1 | 0 | 0 | 0 | 90000 | 10.0X |
| | 1 | 0 | 0 | 1 | NOT USED | |

Fig. 9C. GROUND FAULT PICKUP:

| RESISTORS | BCD CODE S5 S6 S7 S8 | | | | EQUIVALENT RESISTANCE | SETTING |
|---|---|---|---|---|---|---|
| | 0 | 0 | 0 | 0 | NOT USED | |
| R8 | 0 | 0 | 0 | 1 | 700000 | .20X |
| R7 | 0 | 0 | 1 | 0 | 450000 | .25X |
| R7, R8 | 0 | 0 | 1 | 1 | 274000 | .30X |
| R6 | 0 | 1 | 0 | 0 | 200000 | .35X |
| R6, R8 | 0 | 1 | 0 | 1 | 156000 | .40X |
| R6, R7 | 0 | 1 | 1 | 0 | 138000 | .45X |
| R6, R7, R8 | 0 | 1 | 1 | 1 | 116000 | .50X |
| R5 | 1 | 0 | 0 | 0 | 90000 | .60X |
| | 1 | 0 | 0 | 1 | NOT USED | |

Fig. 9D. GROUND FAULT DELAY:

| RESISTORS | BCD CODE S5 S6 S7 S8 | | | | EQUIVALENT RESISTANCE | SETTING | $I^2t$ |
|---|---|---|---|---|---|---|---|
| | 0 | 0 | 0 | 0 | NOT USED | | |
| | 0 | 0 | 0 | 1 | NOT USED | | |
| R7 | 0 | 0 | 1 | 0 | 450000 | MIN | IN |
| R7, R8 | 0 | 0 | 1 | 1 | 274000 | INT | IN |
| R6 | 0 | 1 | 0 | 0 | 200000 | MAX | IN |
| R6, R8 | 0 | 1 | 0 | 1 | 156000 | MIN | OUT |
| R6, R7 | 0 | 1 | 1 | 0 | 138000 | INT | OUT |
| R6, R7, R8 | 0 | 1 | 1 | 1 | 116000 | MAX | OUT |
| | 1 | 0 | 0 | 0 | NOT USED | | |
| | 1 | 0 | 0 | 1 | NOT USED | | |

Fig. 9E. SHORT TIME PICKUP:

| RESISTORS | BCD CODE | | | | EQUIVALENT RESISTANCE | SETTING |
|---|---|---|---|---|---|---|
| | $S_5$ | $S_6$ | $S_7$ | $S_8$ | | |
| | 0 | 0 | 0 | 0 | NOT USED | |
| R8 | 0 | 0 | 0 | 1 | 700 000 | 1.5C |
| R7 | 0 | 0 | 1 | 0 | 450 000 | 2.0C |
| R7, R8 | 0 | 0 | 1 | 1 | 274 000 | 2.5C |
| R6 | 0 | 1 | 0 | 0 | 200 000 | 3.0C |
| R6, R8 | 0 | 1 | 0 | 1 | 156 000 | 4.0C |
| R6, R7 | 0 | 1 | 1 | 0 | 138 000 | 5.0C |
| R6, R7, R8 | 0 | 1 | 1 | 1 | 116 000 | 7.0C |
| R5 | 1 | 0 | 0 | 0 | 90 000 | 9.0C |
| | 1 | 0 | 0 | 1 | NOT USED | |

Fig. 9F. SHORT TIME DELAY:

| RESISTORS | BCD CODE | | | | EQUIVALENT RESISTANCE | SETTING | $I^2t$ |
|---|---|---|---|---|---|---|---|
| | $S_5$ | $S_6$ | $S_7$ | $S_8$ | | | |
| | 0 | 0 | 0 | 0 | NOT USED | | |
| | 0 | 0 | 0 | 1 | NOT USED | | |
| R3 | 0 | 0 | 1 | 0 | 450 000 | MIN | IN |
| R3, R4 | 0 | 0 | 1 | 1 | 274 000 | INT | IN |
| R2 | 0 | 1 | 0 | 0 | 200 000 | MAX | IN |
| R2, R4 | 0 | 1 | 0 | 1 | 156 000 | MIN | OUT |
| R2, R3 | 0 | 1 | 1 | 0 | 138 000 | INT | OUT |
| R2, R3, R4 | 0 | 1 | 1 | 1 | 116 000 | MAX | OUT |
| | 1 | 0 | 0 | 0 | NOT USED | | |
| | 1 | 0 | 0 | 1 | NOT USED | | |

Fig. 9G.

LONG TIME PICKUP:

| RESISTORS | BCD CODE $S_5$ $S_6$ $S_7$ $S_8$ | | | | EQUIVALENT RESISTANCE | SETTING |
|---|---|---|---|---|---|---|
|  | 0 | 0 | 0 | 0 | NOT USED |  |
|  | 0 | 0 | 0 | 1 | NOT USED |  |
|  | 0 | 0 | 1 | 0 | NOT USED |  |
| R7, R8 | 0 | 0 | 1 | 1 | 274000 | .8C |
| R6 | 0 | 1 | 0 | 0 | 200 000 | .9C |
| R6, R8 | 0 | 1 | 0 | 1 | 156 000 | 1.0C |
| R6, R7 | 0 | 1 | 1 | 0 | 138 000 | 1.1C |
|  | 0 | 1 | 1 | 1 | NOT USED |  |
|  | 1 | 0 | 0 | 0 | NOT USED |  |
|  | 1 | 0 | 0 | 1 | NOT USED |  |

Fig. 9H.

LONG TIME DELAY:

| RESISTORS | BCD CODE $S_5$ $S_6$ $S_7$ $S_8$ | | | | EQUIVALENT RESISTANCE | SETTING |
|---|---|---|---|---|---|---|
|  | 0 | 0 | 0 | 0 | NOT USED |  |
|  | 0 | 0 | 0 | 1 | NOT USED |  |
|  | 0 | 0 | 1 | 0 | NOT USED |  |
|  | 0 | 0 | 1 | 1 | NOT USED |  |
| R6 | 0 | 1 | 0 | 0 | 200 000 | MIN |
| R6, R8 | 0 | 1 | 0 | 1 | 156 000 | INT |
| R6, R7 | 0 | 1 | 1 | 0 | 138 000 | MAX |
|  | 0 | 1 | 1 | 1 | NOT USED |  |
|  | 1 | 0 | 0 | 0 | NOT USED |  |
|  | 1 | 0 | 0 | 1 | NOT USED |  |

4,710,844

ELECTRONIC CIRCUIT BREAKER TRIP FUNCTION ADJUSTING CIRCUIT

This is a continuation-in-part of co-pending Ser. No. 760,224, filed July 29, 1985 now abandoned.

BACKGROUND OF THE INVENTION

Circuit breakers employing electronic trip units are available having a wide range of overcurrent pickup and time delay adjustments. Both analog and digital processors are capable of providing adequate circuit protection over a wide range of operating currents. For purposes of this disclosure, an "analog processor" continuously evaluates the input current and initiates a timing mode upon the occasion of an overcurrent condition. A good example of an analog timing circuit is a resistance-capacitance circuit (RC) wherein the RC time constant varies inversely with current. A "digital processor" evaluates only one value of the input current at one point in time. A good example of a digital timing circuit is the overflow time of a register within a microprocessor. To date, circuit breakers using electronic trip units have been limited to industrial type applications of higher ampere-rated frame sizes. The trip units are generally mounted on a front panel of the circuit breakers within a separate housing from the interruption mechanism and the current sensing transformers. However, with thermal-magnetic molded case circuit breakers wherein the operating mechanism and the thermal-magnetic trip unit are both contained within a common case, space requirements have heretofore limited the ratings of these circuit breakers to less than 1200 amperes.

The application of large scale integrated circuit techniques (LSI) to miniaturize the electronic trip unit components has substantially reduced the overall physical size of the electronic trip unit. The discrete circuit components, such as the current sensing transformers, timing capacitors and adjustable resistors, however, limit the extent to which the size of traditional electronic trip units can be reduced.

The purpose of this invention is to describe a circuit arrangement whereby the variable resistors used to set the trip current and time parameters for the circuit breaker electronic signal processor are reduced in number thereby allowing the printed wiring board containing the signal processor to become correspondingly reduced in size.

SUMMARY OF THE INVENTION

A binary encoded switch is used within the resistance networks for setting the time and overcurrent parameters of an electronic trip unit. A selection of resistance values and truth table parameters results in a variable resistance circuit that can be mounted on the front panel of industrial rated circuit breakers. The use of the binary controlled resistance circuit results in a lower cost analog signal processor by a reduction in the number of resistors required to provide the overcurrent and time delay functions. The use of the binary controlled resistance circuit with a digital signal processor sufficiently reduces the size of the printed wiring board to allow the application of electronic trip function to lower rated industrial circuit breakers.

DESCRIPTION OF THE PREFERRED EMBODIMENT

Figure 1:
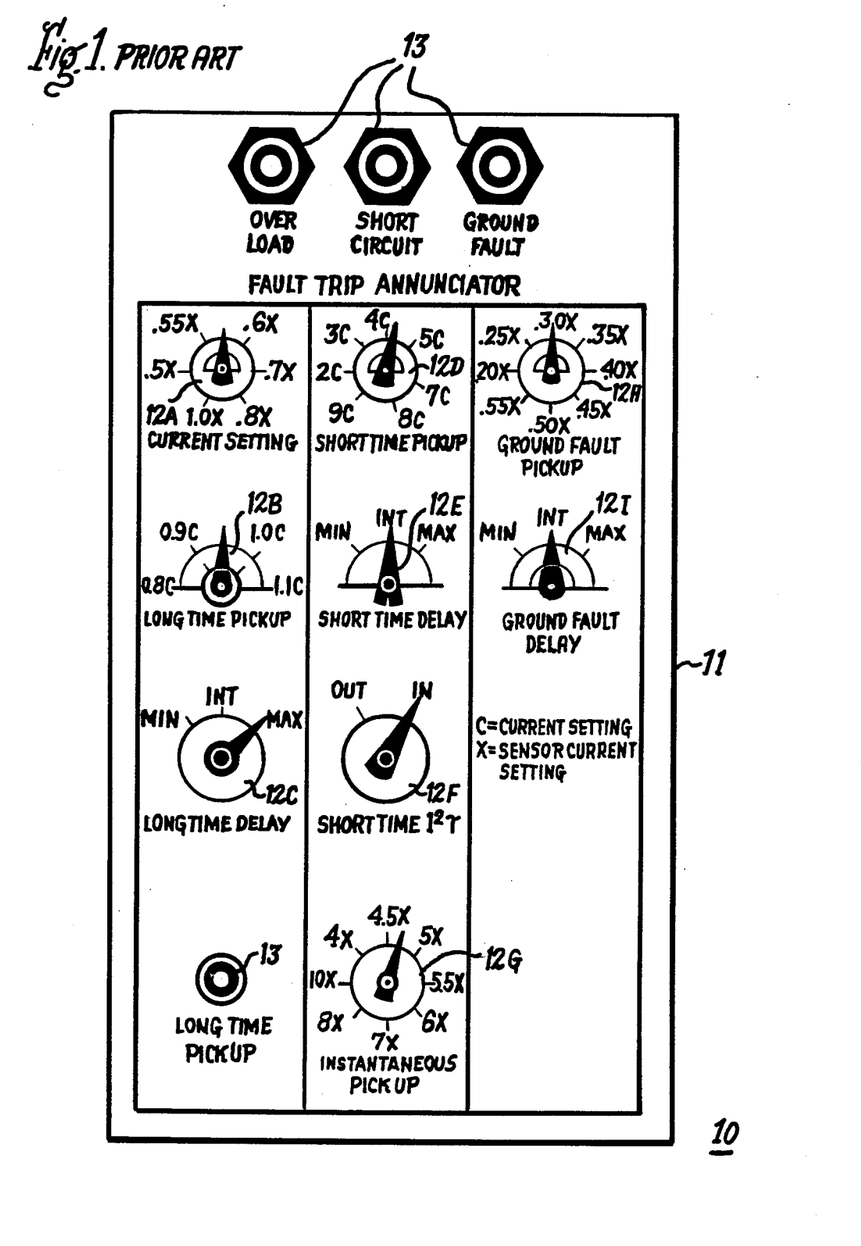
FIG. 1 is a front view of the operating panel of a conventional industrial circuit breaker trip unit.

Before describing the electronic circuit breaker trip function adjusting circuit of the invention, it is helpful to consider the operation of an electronic signal processor used within state-of-the-art circuit breaker trip units. One such electronic trip unit, wherein the trip determination is provided by electronic rather than thermal and magnetic means, is depicted at 10 in FIG. 1. The trip unit circuit is mounted on the reverse side of a front panel 11 such that a plurality of switches 12A–12I are accessible from the front surface of the panel. The switches are used for varying the resistance networks that set the overcurrent values as well as the time delays for the various overcurrent conditions before tripping is initiated. A plurality of corresponding mechanical targets 13 are arranged on the front panel to provide an indication of the nature of the overcurrent condition.

Figure 2:
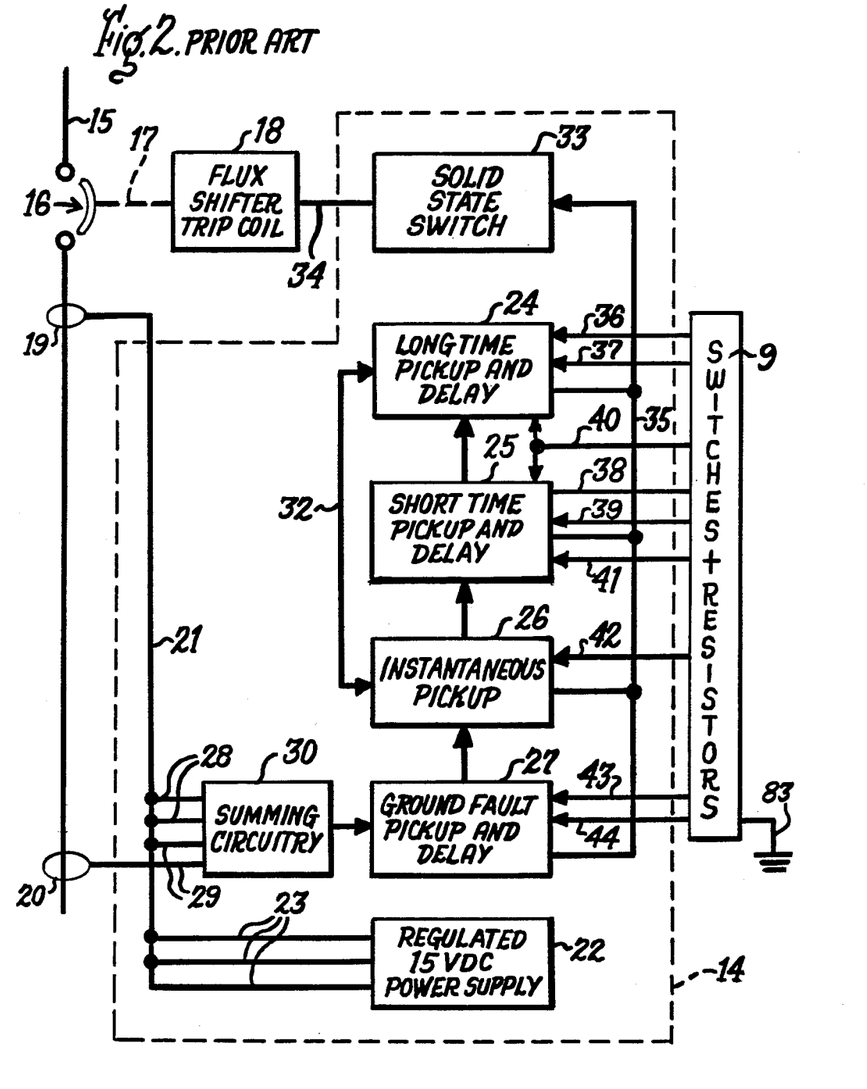
FIG. 2 is a diagrammatic representation of an analog circuit used within the trip unit depicted in FIG. 1.

A simplified analog processor circuit 14 is depicted in FIG. 2 connected to a power bus 15 with a switch 16 in series with the bus and operable by means of a control line 17 and a flux shifter type trip coil actuator unit 18. A current transformer 19 is arranged around the power bus to provide a continuous representation of the level of current through the power bus. A separate current transformer is used for each of the three phase conductors within the power bus and a separate ground fault current transformer 20 is provided for ground fault determination. The input signals derived from the current transformers are connected with the processor circuit by means of a three-conductor cable 21. The current through the power bus also feeds a power supply 22, which is connected to the current transformers by means of conductors 23 and cable 21. A longtime pickup and delay circuit 24, having adjustable settings for both the longtime pickup current and delay time is connected to a solid state switch 33 by means of an output conductor 35 to provide a trip initiating signal to the flux shifter trip coil actuator 18 over conductor 34 when such a long time overcurrent condition exceeds the selected long time delay. A similar short time pickup and delay circuit 25 is connected with the long time pickup and delay circuit 24 for determining the occurrence of a short time pickup and for providing a signal over output line 35 to the solid state switch 33 when the current remains in a short time pickup condition longer than a selected short time delay. An instantaneous pickup circuit 26 is connected with the short time pickup and delay circuit 25 to provide a trip signal over output line 35 as soon as a selected instantaneous pickup current occurs. No time delay is used when an instantaneous pickup overcurrent condition occurs, since immediate tripping is required. A ground fault pickup and delay circuit 27 is connected to the cable 21 by means of phase conductors 28, a separate ground fault conductor 29 and a summing circuit 30. The ground fault pickup and delay circuit provides a trip signal to output conductor 35 when a ground fault condition occurs longer than a selected time delay, similar to the long time and short time delays.

Figure 6:
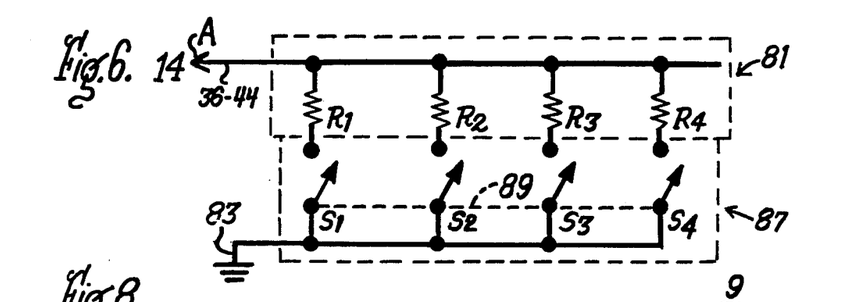
FIG. 6 is a diagrammatic representation of a binary controlled resistance ladder circuit and binary encoded switch according to the invention, used with the analog circuit of FIG. 2.

The overcurrent and time delay values are set by means of a resistance value supplied to each separate pickup and delay circuit. This value is selected by means of a plurality of resistances, such as $R_1$-$R_8$ depicted in FIGS. 6 and 8, arranged within a voltage divider resistance network mounted on the back surface of the front panel 11 of the trip unit 10 of FIG. 1 and accessed from the exterior of the trip unit by means of switches 12A-12I. One such resistance network is found within U.S. Pat. No. 4,115,829 in the name of E. K. Howell, entitled "Overcurrent And Ground Fault Responsive Trip Unit For Circuit Breakers", which Patent is incorporated herein for purposes of reference. The combined switch and resistor network is diagramatically represented as the selection circuit 9 which is connected to reference ground over conductor 83. In such an arrangement, at least as many resistors are required in each resistance network as the total number of set points provided by the trip unit. The switches 12A-12I on the front panel of the trip unit select the particular resistance value from the resistance network contained in the selection circuit and connect with the timing circuits contained in the analog processor circuit 14, over lines 36-44 which correspond as follows. Lines 36, 37 connect the selected resistance values with the long time pickup and delay circuit 24 to set the selected long time pickup current value and the selected long delay time. Lines 38, 39 connect the selected resistance values with the short time pickup and delay circuit 25 and set the selected short time pickup current and the selected short delay time. Line 40 supplies the selected resistance value to both the longtime and short time pickup circuits to set the selected current setting for determining both long time and short time pickup current values. Line 41 supplies the selected resistance value for the short time $I^2T$ pickup current value. Line 42 supplies the selected resistance value to the instantaneous pickup circuit 26 to set the selected instantaneous pickup current value. Lines 43, 44 supply the selected resistance values to the ground fault pickup and delay circuit 27 to set the selected ground fault pickup current and selected delay time. One such analog signal processor circuit is described within the aforementioned U.S. Pat. No. 4,115,829.

Figure 3:
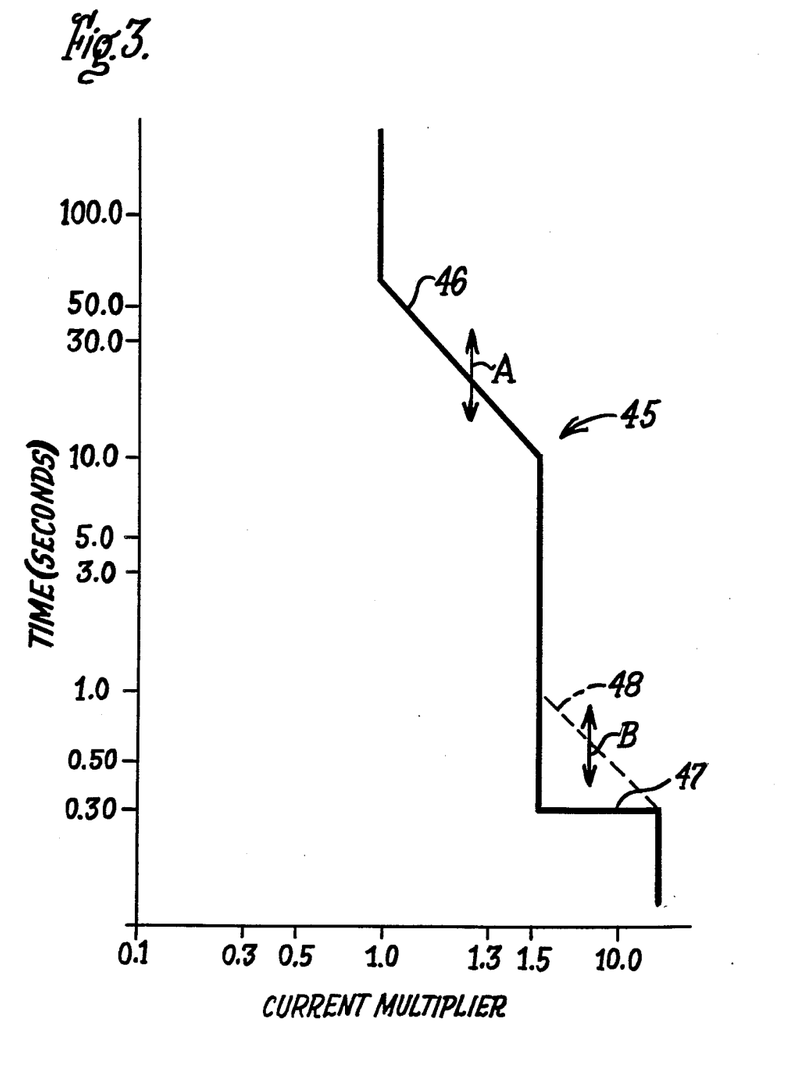
FIG. 3 is a graphic representation of the time delay increments for various overcurrent parameters.

The tripping curve 45, as shown in FIG. 3, is representative of the selectable trip set points and delay times and is plotted as a logarithmic function of current and time. The ramp sloped longtime region 46 represents overcurrent conditions existing approximately from one to one and a half times the current selected on the trip unit front panel of FIG. 1 for a long time delay variation indicated at A. The short time delay, which occurs between approximately one and a half times to fifteen times the selected current, is represented by both a planar region 47 and a ramp-sloped region 48 designated "$I^2t$". The short time delay range is indicated at arrow B. The trip unit is arranged to trip at any current selection above approximately 15 times the selected current.

Figure 6A:
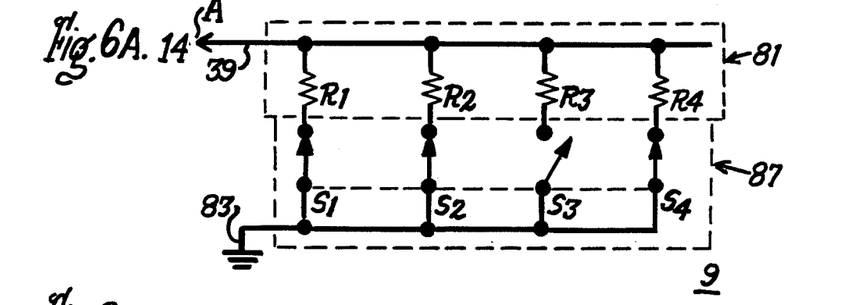
FIG. 6A is a diagrammatic representation of the resistance ladder and switch arrangement of FIG. 6 for a $0.5 \times$ setting on the trip unit within the analog circuit of FIG. 2.
Figure 7A:
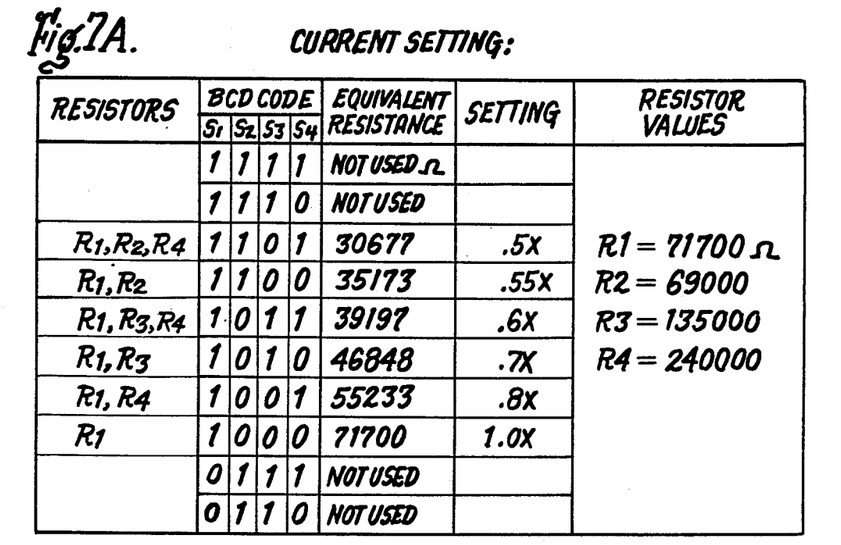
FIGS. 7A–7H are truth table representations of the resistance output values and binary encoded switch positions for the analog circuit of FIG. 2.

It has since been determined that the number of resistors within the selection circuit 9 can be reduced without affecting the range of trip settings by the use of binary controlled resistance ladder networks and digitally encoded switches in place of the serially connected resistors and switches utilized in the referenced signal processor circuit. One such digitally encoded switch 87 for use within the switches 12A-12I on the trip unit 10 of FIG. 1 to set the overcurrent and time delay values of the processor trip unit 14 of FIG. 2 is depicted within the selection circuit 9 of FIG. 6, wherein four resistors $R_1$-$R_4$ comprise a first part of a resistance bridge 81. The resistors are electrically connectable in parallel and are commonly connected with ground via conductor 83. The digitally encoded switch 87 is a four-pole multiway switch with the individual poles $S_1$-$S_4$, which are operably interconnected as indicated at 89, to provide the binary encoding. One such switch capable of providing such function is a type BCD 1248 obtained from the EECO Company, Santa Anna, Calif. Any number of poles can be employed depending upon the number of functions desired. The truth tables and the resistor values for the current setting, longtime pickup, long time delay, short time pickup, short time delay, ground fault pickup, ground fault delay and instantaneous trip functions for the selection circuit 9 used with the analog processor circuit 14 of FIG. 2 are depicted within FIGS. 7A-7H, respectively. Referring back to FIG. 6, the switch poles $S_1$-$S_4$ are connected in common to ground over conductor 83 and the selected resistance value appearing at terminal A is applied to the various overcurrent and delay circuits within the analog processor circuit 14 of FIG. 2 over conductors 36-44 respectively. The selection of a particular resistance value by means of switch 87 can be seen by now referring to both FIGS. 6A and 7A. Switch poles $S_1$-$S_4$ arranged in accordance with the BCD Code of FIG. 7A for a trip unit switch position setting of 0.5× for the current setting, for example, results in the parallel connection of resistors $R_1$, $R_2$, $R_4$ and a resistance value of 30677 ohms on conductor 39 at terminal A. For current setting switch positions of 0.55× to 1.0×, the corresponding switch poles are connected in accordance with the designated BCD Codes. The switch pole connections for long time pickup, long time delay, short time pickup, short time delay, ground fault pickup, ground fault delay and instantaneous settings are depicted in FIGS. 7B-7H respectively.

The trip function adjustment of the invention also finds application within an electronic trip unit employing a digital processor. One such digital trip unit is described in U.S. Pat. No. 4,038,695 in the name of R. P. DePuy, entitled "Static Trip Unit For Circuit Protective Devices", which patent is incorporated herein for reference purposes.

Figure 4:
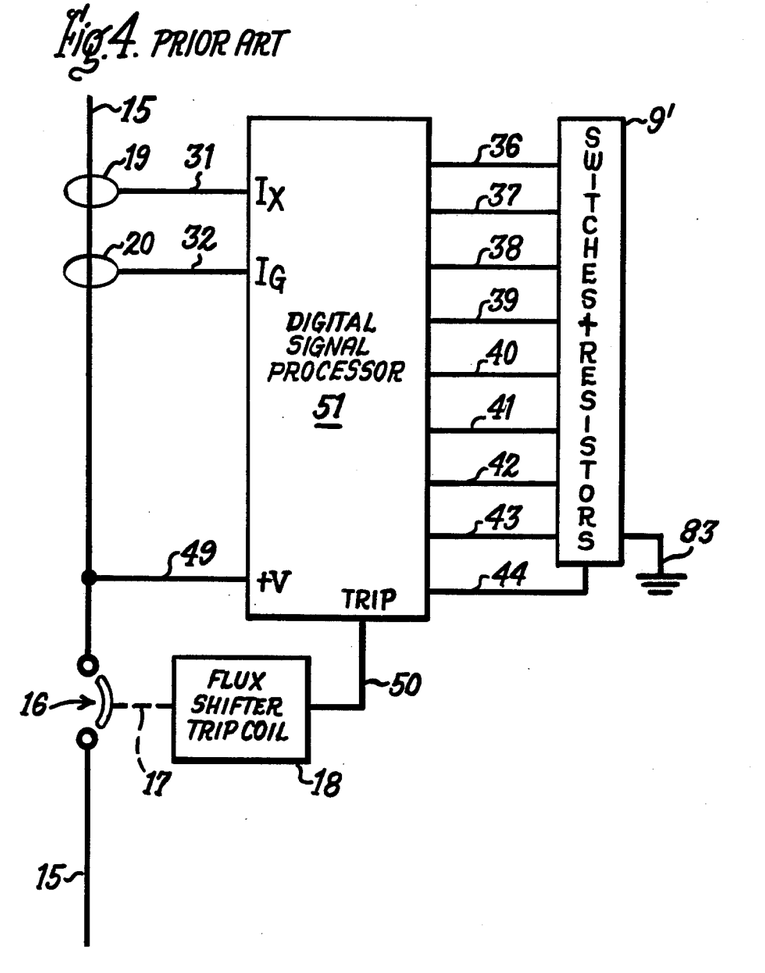
FIG. 4 is a diagrammatic representation of a digital circuit used with the trip unit depicted in FIG. 1.

A digital processor circuit 51 is shown in FIG. 4 wherein like reference numerals will be employed, where possible, for comparison to the analog processor described earlier with reference to FIG. 2. A similar selection circuit 9' contains a plurality of adjustable switch-controlled resistors connected with the digital signal processor circuit over conductors 36–44 to set the values of the resistors. The selection circuit is connected with reference ground over conductor 83. The current through bus 15 is monitored by means of the current transformer 19, which inputs a representative current value $I_X$ to the signal processor over conductor 31. A similar ground fault current transformer 20 inputs a representative ground fault current value $I_G$ over conductor 32. Power supply voltage is applied to the signal processor circuit over conductor 49 and a trip output signal is supplied to the flux shifter trip coil 18 over conductor 50 to trip the breaker by interrupting the contacts 16 by operative connection with the contacts by means of control line 17.

Figure 5:
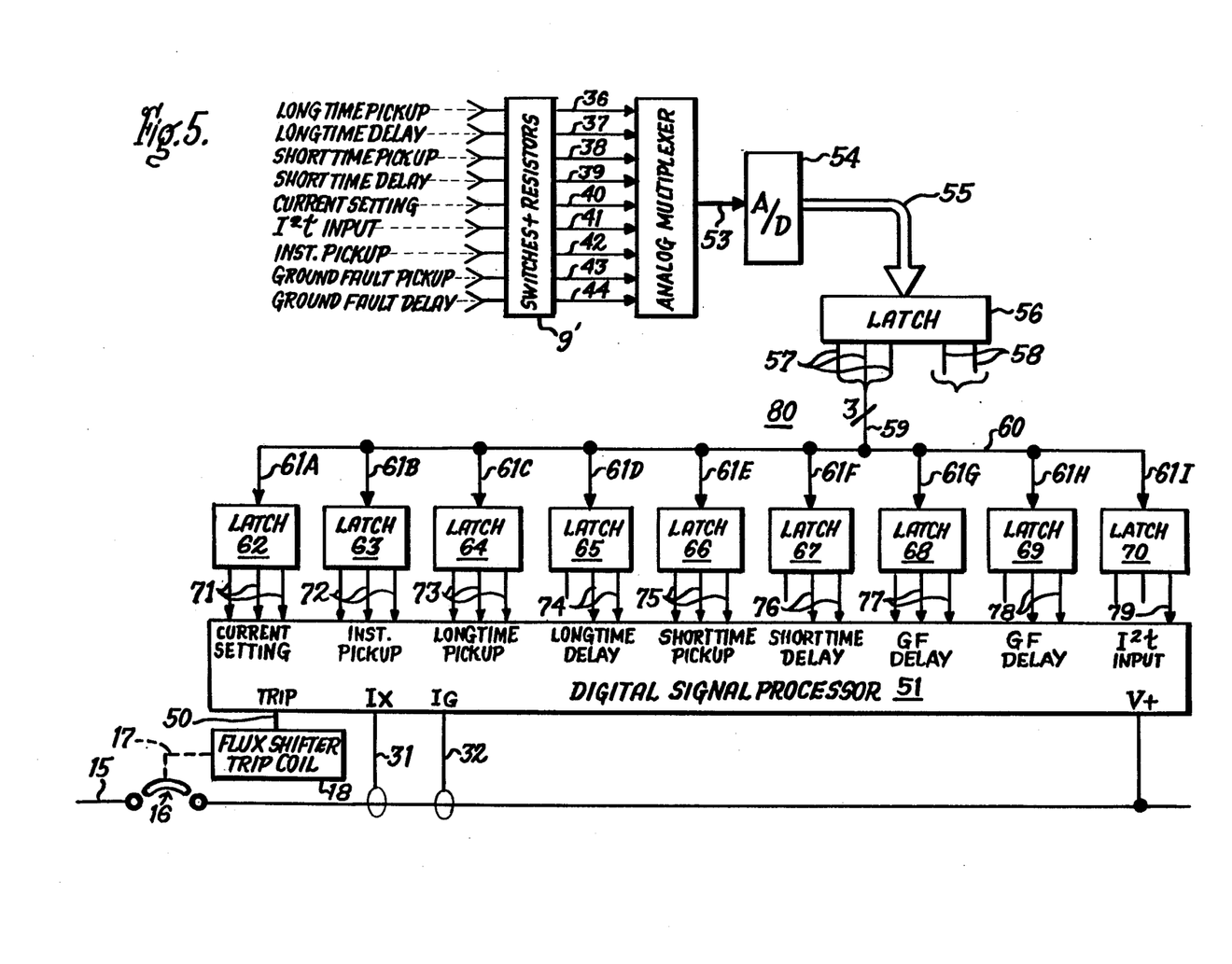
FIG. 5 is a diagrammatic representation of a compression circuit, according to the invention, used with the digital circuit of FIG. 4.

A data concentrator circuit 80 shown in FIG. 5 is used for accepting the trip setting data in analog format from the selection circuit 9' and for inputting this data in digital format to the digital processor circuit 51. The trip setting resistor information from the selection circuit is presented to an analog multiplexer 52 over corresponding input lines 36–44. This information is in analog data form and is converted to digital data form in an A/D converter 54 which is connected with the multiplexer by means of conductor 53. The digital data information is inputted over a data bus 55 to a holding latch 56, wherein the most significant data bits, hereafter MSB, are outputted over conductors 57 to a three data bit line 59 and to a three bit input data bus 60. The two least significant data bits over the output lines 58 are not used. The three MSB's from input bus 60 are applied over a plurality of input lines 61A–61I to a corresponding plurality of set point latches 62–70. The corresponding output data lines 71–79 provide the appropriate number of data bits representing the digitally encoded data information corresponding to the original data received on input lines 36–44. It is noted that nine such input lines 36–44, each corresponding to a particular current or time set point, are sufficient for receiving all the information indicated on the face plate of the trip unit depicted in FIG. 1. The analog multiplexer 52, A/D converter 54, holding latch 56 and latches 62–70 are contained within a single semiconductor integrated circuit and are integral with the digital processor circuitry contained within the same integrated circuit. In the absence of the data concentrator circuit 80, twenty-two such input lines would be required for receiving sufficient information in digital format to otherwise provide the information received on the nine input lines 36–44. A semiconductor chip requiring only nine input pins for set point control information compared to twenty-two input pins to input the same set point control information represents a substantial savings both in component cost as well as component size and configuration. A good description of a digital processor circuit in integrated circuit format is found in U.S. Pat. No. 4,589,052, issued May 13, 1986, entitled "Digital I²t Pickup, Time Bands and Timing Control Static Trip Circuit Breaker", in the name of John J. Dougherty, which Patent is incorporated herein for purposes of reference. This digital processor circuit is implemented in very large scale integrated circuit format and reference should be made to this Patent for an understanding of how the digital data representation of the trip settings is processed in a digital format.

Figure 7H:
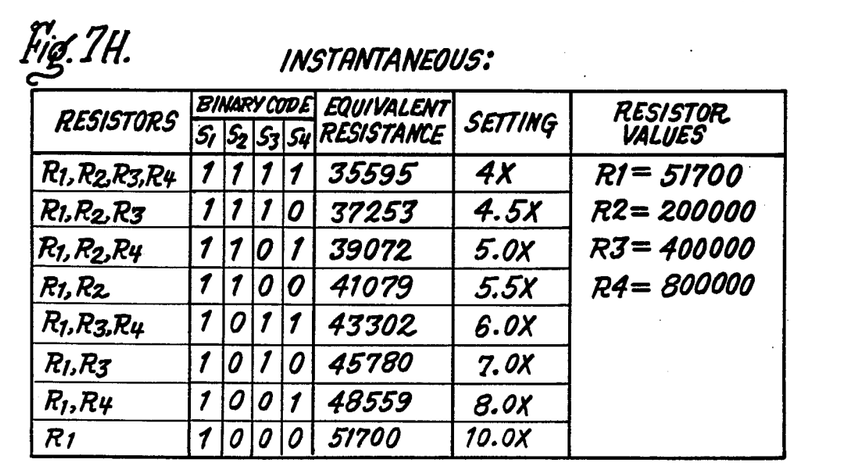
Figure 8:
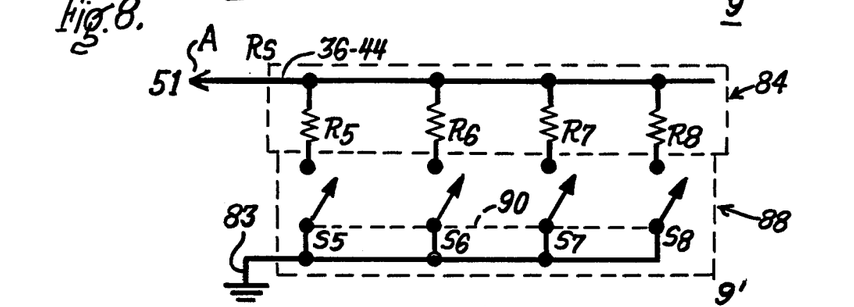
FIG. 8 is a diagrammatic representation of a binary controlled resistance ladder circuit and binary encoded switch according, to the invention, used with the digital circuit of FIG. 4.
Figure 8A:
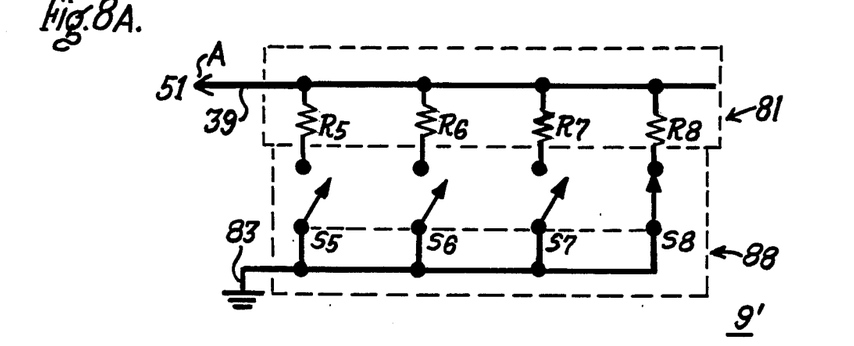
FIG. 8A is a diagrammatic representation of the resistance ladder and switch arrangement of FIG. 8 for a $0.5 \times$ setting on the trip unit within the digital circuit of FIG. 4.
Figure 9A:
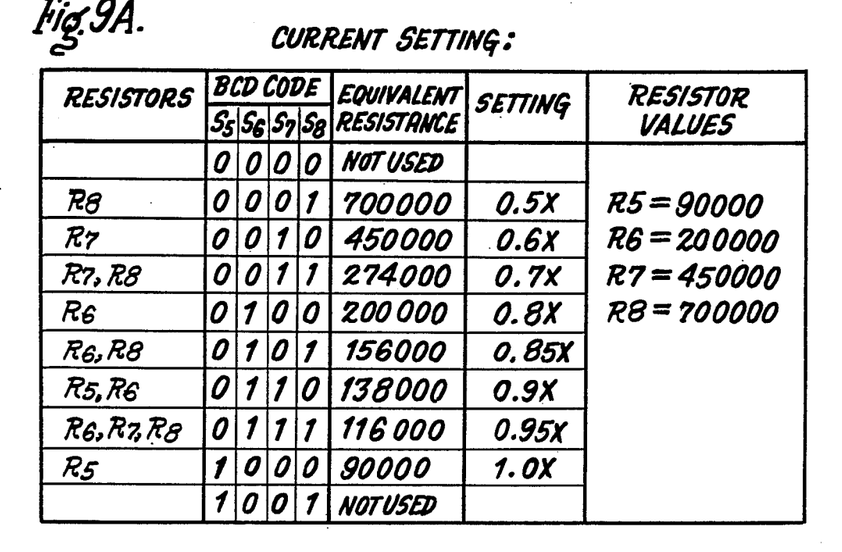
FIGS. 9A–9H are truth table representations of the resistance output and binary encoded switch positions for the digital circuit of FIG. 4.

The selection circuit 9' connected with the digital processor 51 of FIG. 5 through the data compressor circuit 80 can also be directly connected with the digital processor 51 as shown in FIG. 4. The resistance network 84 for the selection circuit 9' is shown in FIG. 8 and consists of resistors $R_5$–$R_8$ electrically connectable in parallel with each other and commonly connected with reference ground via conductor 83. The digitally encoded switch 88 controls the position of the individual poles $S_5$–$S_8$, which are operably interconnected as indicated at 90. The digitally encoded switch selects the resistance value within the resistance network 84, which resistance value is inputted at terminal A to conductors 36–44 and to the digital signal processor circuit 51. The switch poles are assigned "1" for a closed switch position and "0" for an open switch to conform to the binary switch code. The truth tables governing the selected resistance values are given in FIGS. 9A through 9H and operate to provide the selected resistance as described earlier with reference to FIGS. 7A through 7H. The switch position of a current setting of 0.5×, for example, is depicted within the selection circuit 9' of FIG. 8A which corresponds to the truth table depicted in FIG. 9A. For this setting, a resistance value of 700,000 is reflected at terminal A and is presented over conductor 39 to the digital signal processor circuit 51.

It has thus been shown that savings in manufacturing process time, circuit components, and in the overall size of an electronic trip unit can be achieved by the use of binary coded digital switches in combination with selected resistance values arranged according to a predetermined switch position. The truth tables for the binary coded digital switches then determine the resistance values required for the plurality of trip data set points.

Figure 7B:
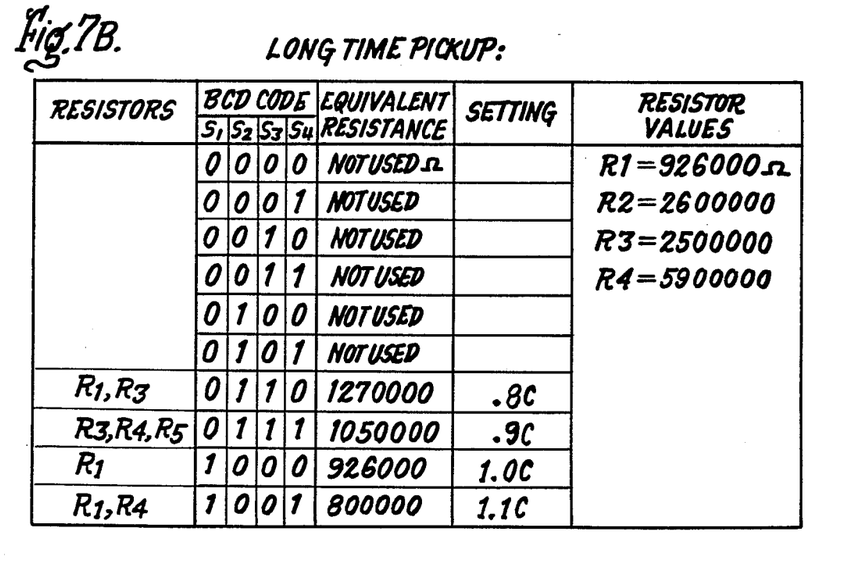
Figure 7C:
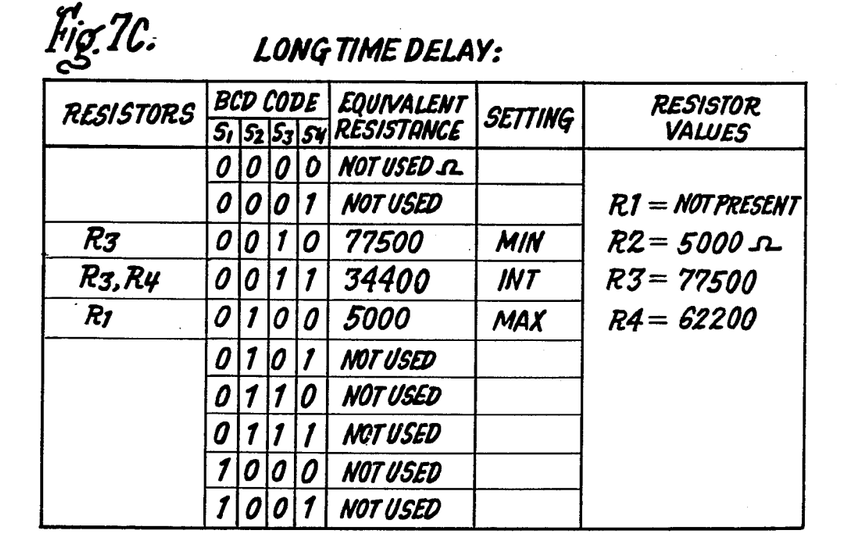
Figure 7D:
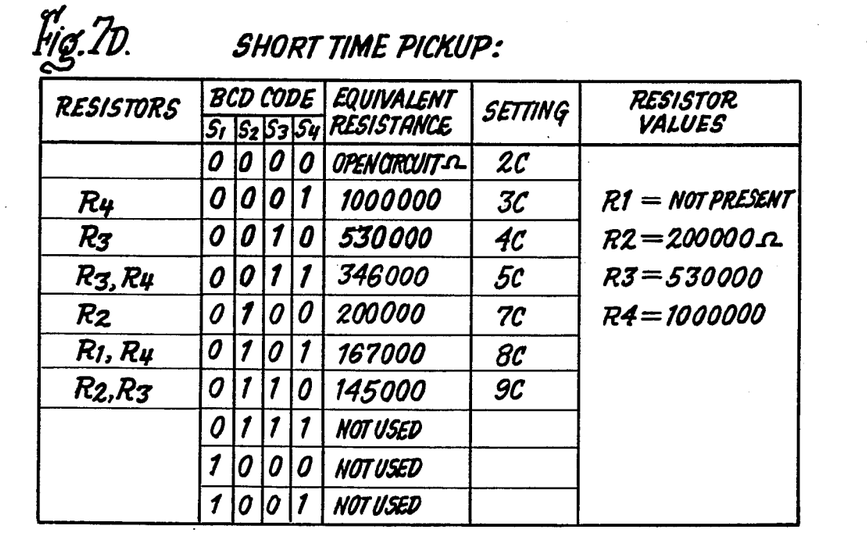
Figure 7E:
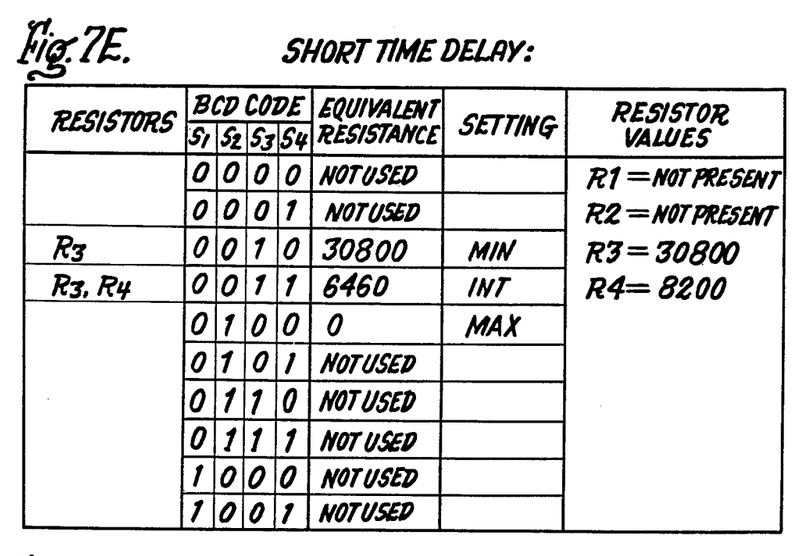

Having described our invention, what we claim as new and desire to secure by Letters Patent is:

1. An electronic circuit interrupter comprising:
   current sensing means arranged around a bus conductor within a protected circuit and providing an output current in proportion to current through said protected circuit;
   first circuit means including a first signal processor connected with said current sensing means for determining overcurrent conditions of first predetermined magnitudes and connected with a trip actuating coil initiating first time delays prior to providing a first tripping signal to said trip actuating coil to separate a pair of separable contacts serially connected within said bus conductor and controlled by said trip actuating coil;
   first pickup setting means connected with said first circuit means for providing numeric values representing said first predetermined magnitudes, said first pickup setting means including a first binary encoded switch;
   second circuit means for determining overcurrent conditions of second predetermined magnitudes and initiating second time delays prior to providing a second tripping signal to said trip actuating coil to separate said contacts said first binary encoded switch being encoded as depicted in FIG. 7B.

2. The electronic circuit interrupter of claim 1 including second pickup setting means connected with said second circuit means for proving numeric values representing said second predetermined magnitudes, said second circuit means comprising a second processor and said second pickup setting means including a second binary encoded switch said second binary encoded switch being encoded as depicted in FIG. 7B.

3. The electronic circuit interrupter of claim 2 wherein said second pickup means includes a second plurality of resistors electrically connectable in parallel.

4. The electronic circuit interrupter of claim 3 wherein said second binary encoded switch comprises a second multiway multipole switch, one of said second plurality of resistors being electrically connected with a corresponding pole of said second multipole switch for setting said second predetermined overcurrent magnitudes.

5. The electronic circuit interrupter of claim 1 including a third circuit means for determining ground fault conditions of third predetermined magnitudes and for initiating third time delays prior to providing a third tripping signal to said trip actuating coil and fourth circuit means for determining overcurrent conditions of fourth predetermined magnitudes and providing a fourth tripping signal to said trip actuating coil with no intentional time delay.

Figure 7F:
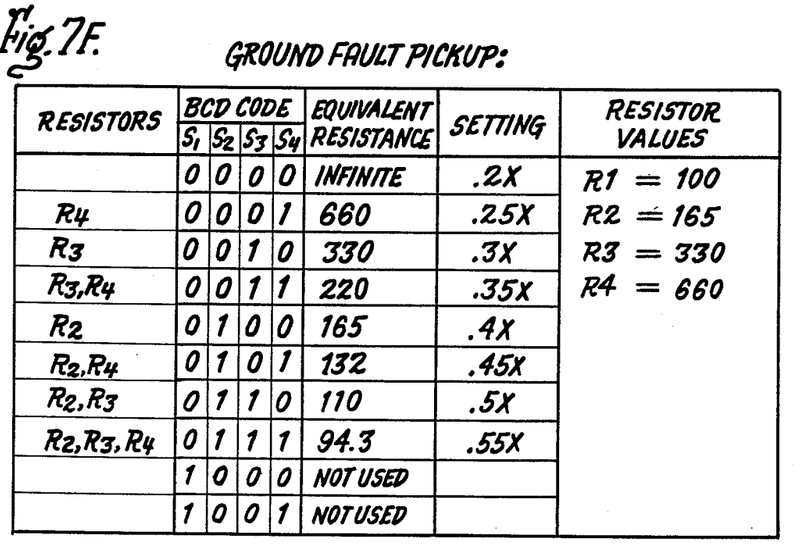
Figure 7G:
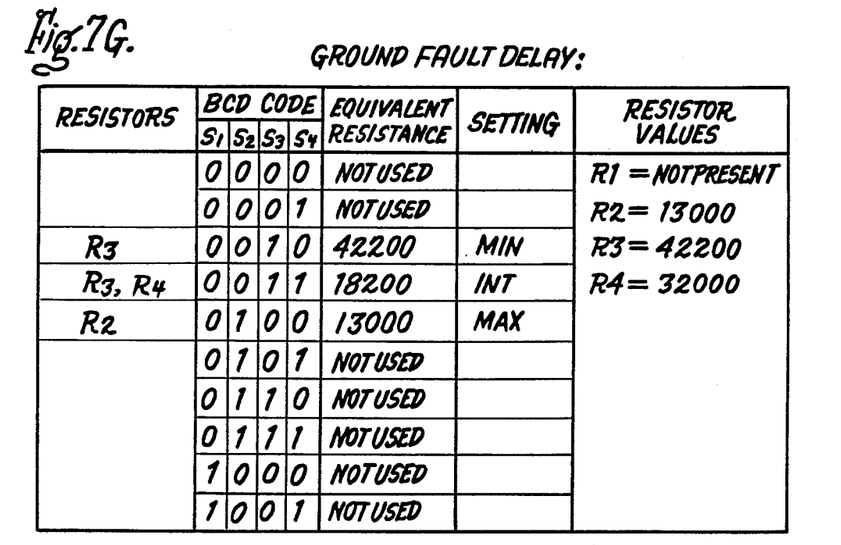

6. The electronic circuit interrupter of claim 5 including third pickup setting means connected with said third circuit means for providing numeric values representing said third predetermined magnitudes, said third circuit means comprising a third binary encoded switch said third binary switch being encoded as depicted in FIG. 7F.

7. The electronic circuit interrupter of claim 5 wherein said third pickup setting means includes a third plurality of resistors electrically connectable in parallel.

8. The electronic circuit interrupter of claim 7 wherein said third binary encoded switch comprises a third multiway multipole switch, one of said third plurality of resistors being electrically connected with a corresponding pole of said third multipole switch for setting said third predetermined ground fault magnitudes.

9. The electronic circuit interrupter of claim 8 including fourth pickup setting means connected with said fourth circuit means for providing numeric values representing said fourth predetermined magnitudes, said fourth circuit means comprising a fourth signal processor and said fourth pickup setting means comprising a fourth binary encoded switch said fourth binary switch being encoded as depicted in FIG. 7H.

10. The electronic circuit interrupter of claim 9 wherein said fourth pickup setting means includes a fourth plurality of resistors electrically connectable in parallel.

11. The electronic circuit interrupter of claim 10 wherein said fourth binary encoded switch comprises a fourth multiway multipole switch, one of said fourth plurality of resistors being electrically connected with a corresponding pole of said fourth multipole switch for setting said fourth predetermined magnitudes.

12. The electronic circuit interrupter of claim 2 including first delay setting means connected with said first circuit means for providing numeric values representing said first time delays, said first delay setting means including a fifth binary encoded switch and a fifth plurality of resistors electrically connectable in parallel, one of said fifth plurality of resistors being connected with a corresponding pole of said fifth binary encoded switch, said fifth binary encoded switch being encoded as depicted in FIG. 7C.

13. The electronic circuit interrupter of claim 12 including second delay setting means connected with said second circuit means for providing numeric values representing said second time delays, said second delay setting means including a sixth binary encoded switch and a sixth plurality of resistors electrically connectable in parallel, one of said sixth plurality of resistors electrically connectable in parallel, one of said sixth plurality of resistors being connected with a corresponding pole of said sixth binary encoded switch said sixth binary encoded switch being encoded as depicted in FIG. 7E.

14. The electronic circuit interrupter of claim 13 including third time delay setting means connected with said third means for providing numeric values representing said third time delays, said third delay setting means including a seventh binary encoded switch and a seventh plurality of resistors connectable in parallel, one of said seventh plurality of resistors being connected with a corresponding pole of said seventh binary encoded switch being encoded as depicted in FIG. 7G.

Figure 9B:
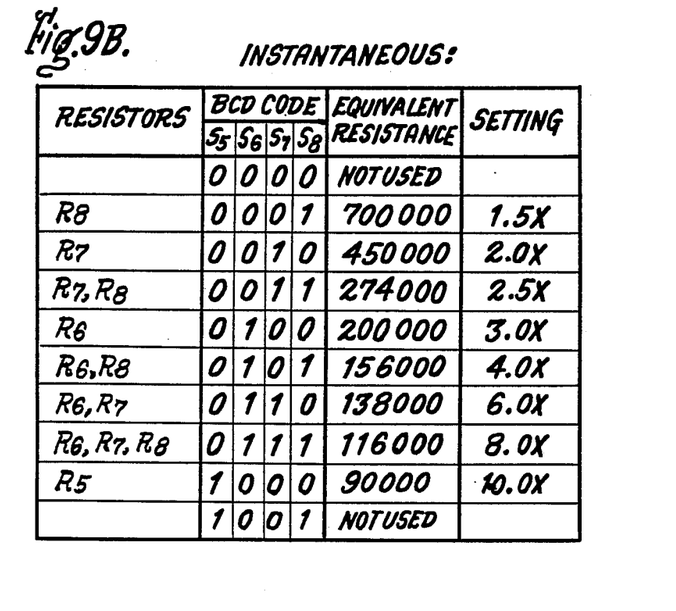
Figure 9C:
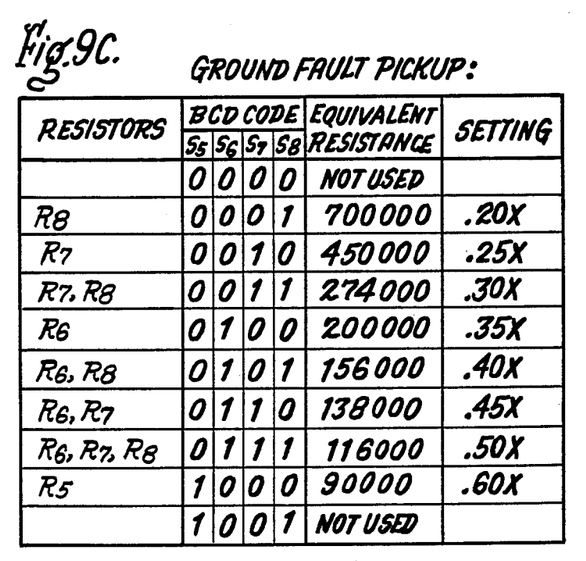
Figure 9D:
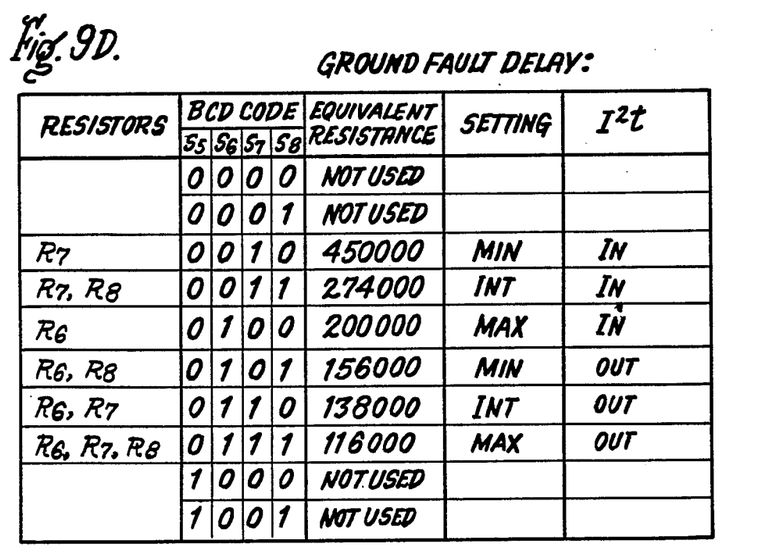
Figure 9E:
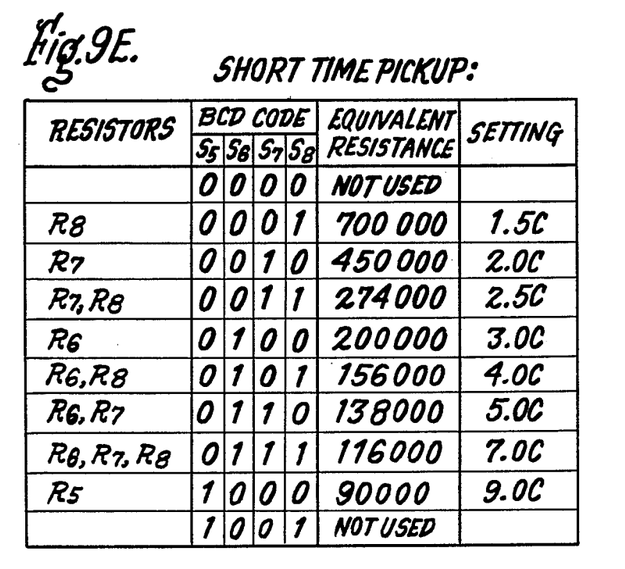
Figure 9F:
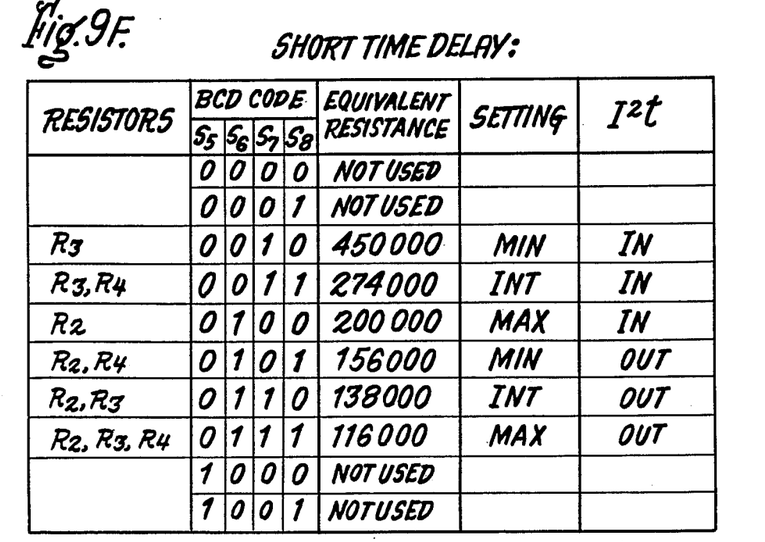
Figure 9G:
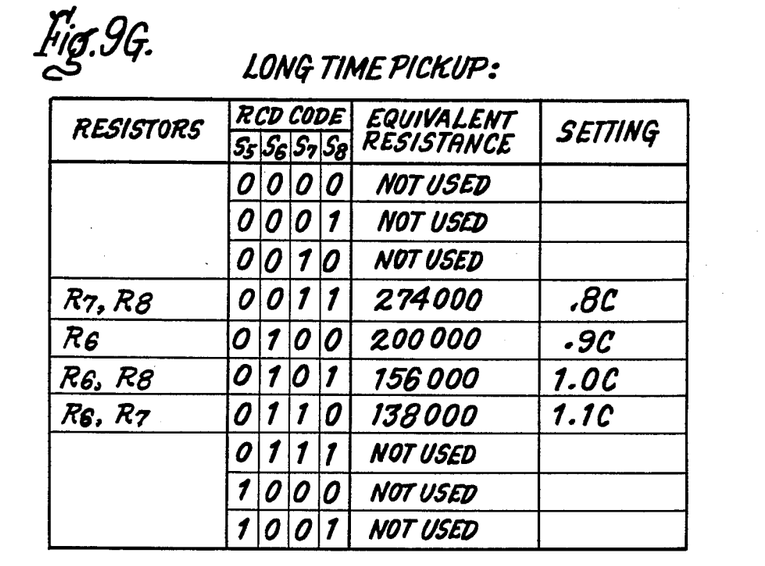
Figure 9H:
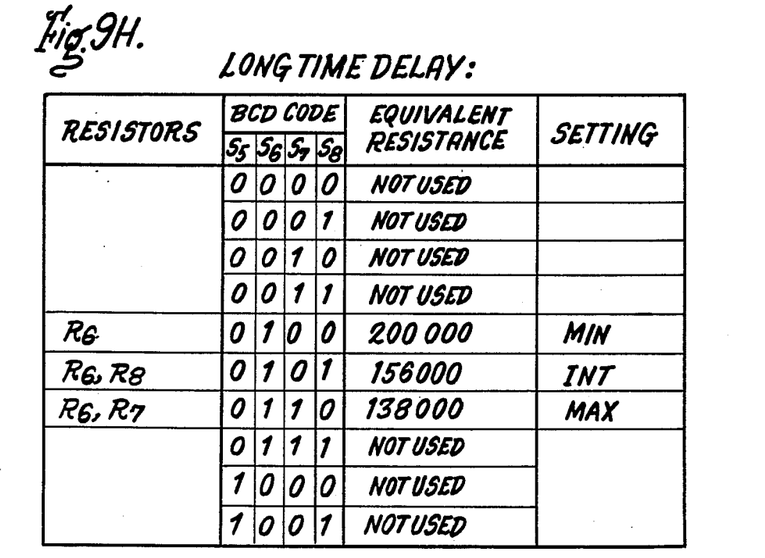

15. An electronic circuit interrupter comprising:
current sensing means for providing an output current in proportion to current through a protected circuit;
first circuit means connected with said current sensing means for determining overcurrent conditions of first predetermined magnitudes and for initiating first time delays prior to providing a first tripping signal to a trip actuating coil;
a pair of separable contacts for serial connection within said protected circuit and controlled by an operating mechanism and said trip actuating coil;
first input data circuit means connected with said first circuit means for providing numeric values representing said first predetermined magnitudes, said first input circuit means being connected with said first circuit means through a data compressor circuit, said data compressor circuit comprising multiplexer circuit means and an A/D converter, said first input data circuit means comprising a first multipole binary encoded switch, said first binary encoded switch being encoded as depicted in FIG. 9G.

16. The electronic circuit interrupter of claim 15 including second circuit means for determining overcurrent conditions of second predetermined magnitudes and for initiating second time delays prior to providing a second tripping signal to said trip actuating coil, said second circuit means being connected with second input circuit means for providing numeric values representing said second predetermined magnitudes said second input circuit means comprising a second binary encoded switch, said second binary encoded switch being encoded as depicted in FIG. 9E.

17. The electronic circuit interrupter of claim 15 including third circuit means for determining ground fault conditions of third predetermined magnitudes and for initiating third time delays prior to providing a third tripping signal to said trip actuating coil, said third circuit means being connected with third input data circuit means for providing numeric values representing said third predetermined magnitudes third input data circuit means comprising a third binary encoded switch, said third binary encoded switch being encoded as depicted in FIG. 9C.

18. The electronic circuit interrupter of claim 15 including fourth circuit means for determining overcurrent conditions of fourth predetermined magnitudes and providing a fourth tripping signal to said trip actuating coil with no intentional time delay, said fourth circuit means being connected with fourth input data circuit means for providing numeric values representing said fourth predetermined magnitudes said fourth input data means comprising a fourth binary encoded switch, said fourth binary encoded switch being encoded as depicted in FIG. 9B.

* * * * *